United States Patent
Xie et al.

(10) Patent No.: US 11,240,054 B2
(45) Date of Patent: Feb. 1, 2022

(54) MULTICAST SERVICE PROCESSING METHOD AND ACCESS DEVICE

(71) Applicant: HUAWEI TECHNOLOGIES CO., LTD., Shenzhen (CN)

(72) Inventors: Guoqing Xie, Shenzhen (CN); Ying Chen, Xi'an (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 18 days.

(21) Appl. No.: 16/561,537

(22) Filed: Sep. 5, 2019

(65) Prior Publication Data
US 2019/0394056 A1   Dec. 26, 2019

Related U.S. Application Data

(63) Continuation of application No. PCT/CN2017/075773, filed on Mar. 6, 2017.

(51) Int. Cl.
*H04L 12/18* (2006.01)
*H04W 72/00* (2009.01)
*H04W 72/04* (2009.01)

(52) U.S. Cl.
CPC ........ *H04L 12/189* (2013.01); *H04L 12/1859* (2013.01); *H04W 72/005* (2013.01); *H04W 72/0413* (2013.01)

(58) Field of Classification Search
CPC ............... H04L 12/189; H04L 12/1859; H04L 12/1863; H04L 69/14; H04L 65/4076;
(Continued)

(56) References Cited

U.S. PATENT DOCUMENTS 6,963,576 B1 *  11/2005  Lee .................. H04L 47/10
                                                    370/395.4
2007/0053356 A1 *  3/2007  Konda ............... H04L 47/521
                                                    370/390
(Continued)

FOREIGN PATENT DOCUMENTS

CN          1946040 A       4/2007
CN          101778030 A     7/2010
(Continued)

OTHER PUBLICATIONS

ITU-T G.8032/Y.1344 Amendment 1 (Nov. 2016), "Series G: Transmission Systemsand Media, Digital Systems and Networks Packet over Transport aspects—Ethernet over Transport aspects Series Y: Global Information Infrastructure, Internet Protocol Aspects and Next-Generation Networks, Ethernet ring protection switching Amendment 1", International Telecommunication Union, Rec. ITU-T G.8032/Y.1344 (2015)/Amd.1 (Nov. 2016), total 84 pages.

*Primary Examiner* — Justin T Van Roie
(74) *Attorney, Agent, or Firm* — Maier & Maier, PLLC

(57) ABSTRACT

A multicast service processing method and an access device. In the method, an access device receives an on-demand request; the access device separately sends the on-demand request to a multicast source device through a first uplink port of the access device and a second uplink port of the access device, so that the multicast source device sends a first multicast packet and a second multicast packet based on the on-demand request; the access device receives the first multicast packet through the first uplink port of the access device, and receives the second multicast packet through the second uplink port of the access device; the access device obtains a multicast data stream based on attribute information of the first multicast packet and attribute information of
(Continued)

the second multicast packet; and the access device sends the obtained multicast data stream to the program terminal.

20 Claims, 4 Drawing Sheets

(58) Field of Classification Search
CPC ............... H04L 65/80; H04W 72/005; H04W 72/0413
See application file for complete search history.

(56) References Cited

U.S. PATENT DOCUMENTS

| | | |
|---|---|---|
| 2009/0201803 A1 | 8/2009 | Filsfils et al. |
| 2014/0233563 A1 | 8/2014 | Chen et al. |
| 2015/0026542 A1 | 1/2015 | Brennum |
| 2018/0069908 A1* | 3/2018 | Buchanan ............... H04L 12/18 |

FOREIGN PATENT DOCUMENTS

| | | |
|---|---|---|
| CN | 102598586 A | 7/2012 |
| WO | 2012/127369 A1 | 9/2012 |

\* cited by examiner

MULTICAST SERVICE PROCESSING METHOD AND ACCESS DEVICE

CROSS-REFERENCE TO RELATED APPLICATIONS

This application is a continuation of International Application No. PCT/CN2017/075773, filed on Mar. 6, 2017, the disclosure of which is hereby incorporated by reference in its entirety.

FIELD

Embodiments of the invention relate to the communications field, and in particular, to a multicast service processing method and an access device.

BACKGROUND

An internet protocol television (IPTV) is a product obtained by combining an IP network technology and a media technology in a specific development phase. In conventional digital video broadcasting (DVB), video content is propagated and watched over a broadcast and television network. In the IPTV, video content is propagated and watched over an IP network. Compared with the conventional broadcast and television network, the IPTV technology can be used to combine a video network and a data network to reduce costs of repeated network construction. However, video deployment in the IP network is unstable due to a contradiction between resource preemption and real-time performance of watching a video in the IP network. When a forwarding packet loss and a forwarding delay are caused by a break in a forwarding link and congestion of a routing node in the IP network, video experience cannot meet an experience requirement. This requires a multicast service backup processing method.

FIG. 1 is a schematic flowchart of a conventional ring network-based multicast service backup. As shown in FIG. 1, a rapid spanning tree protocol (RSTP) is applied to the multicast service backup. Each access node (access node, AN) may include two network ports. The network port is an uplink port of an Internet group management protocol (IGMP), and is also a cascade port. There are nodes S1, S2, B1, B2, and B3. The nodes S1 and S2 receive a multicast stream sent by a multicast source, and the nodes B1, B2, and B3 are configured to transmit the multicast stream. B1 includes ports P0 and P1; B2 includes ports P2 and P3; and B3 includes ports P4 and P5.

In a normal network state, the port P5 of the node B3 is blocked. The node B2 receives an on-demand request of a user for an on-demand program. The on-demand request is reported through the ports P2 and P3 of B2, two multicast forwarding table trees are established, and the multicast forwarding table trees are a link L1 and a link L2. The node S2 receives a multicast data stream (or referred to as a multicast video stream) delivered by the multicast source, and delivers the multicast data stream to B2 by using S1. In other words, the multicast data stream arrives at the user over the link L1. In a faulty network state, to be specific, when the link L1 is faulty, the link L2 is unblocked, so that the multicast data stream is quickly pushed to the user over the link L2.

However, the RSTP applied to network networking in which this method is used can only be backed up at a layer 2 network, but cannot be backed up at an IP layer. In addition, only one link works normally in the normal network state or faulty network state, resulting in a high packet loss rate. In addition, when the link L1 is switched to the link L2, a switching delay is caused.

SUMMARY

Embodiments of the invention provide a multicast service processing method and an access device, to improve forwarding quality of a multicast data stream in an IP network.

According to a first aspect, a multicast service processing method is provided, and the method may include: an access device receives an on-demand request sent by a program terminal, where the on-demand request is sent by different program terminals or a same program terminal of a same program. The access device separately sends the on-demand request to a multicast source device through a first uplink port of the access device and a second uplink port of the access device, so that the multicast source device sends a first multicast packet and a second multicast packet based on the on-demand request, where the multicast packet is an IP multicast packet. The access device specifies two different uplink ports for each multicast program to send an on-demand request or receive a corresponding multicast packet. For example, the access device respectively sends, along two paths through the first uplink port and the second uplink port, join requests that include on-demand requests to forwarding routers on two transmission paths. The access device receives the first multicast packet through the first uplink port of the access device, and receives the second multicast packet through the second uplink port of the access device. The access device then sends the join requests to the multicast source device along the two paths. The access device obtains a multicast data stream based on attribute information of the first multicast packet and attribute information of the second multicast packet. The access device sends the obtained multicast data stream to the program terminal. According to this method, a multicast packet is forwarded in an IP network. A dual-transmitter and dual-receiver structure on two paths of the access device is used, thereby reducing a packet loss rate and a forwarding delay in the IP network, and improving forwarding quality of a multicast data stream in the IP network.

In an optional implementation, the obtaining, by the access device, of a multicast data stream based on attribute information of the first multicast packet and attribute information of the second multicast packet includes: obtaining, by the access device, the multicast data stream based on sequence information (for example, a sequence number) of the first multicast packet and sequence information of the second multicast packet. The sequence number is used to identify a number of a multicast packet. The sequence number is increased by 1 each time the multicast source device sends a packet, and the access device may detect a packet loss status by using the sequence number.

In an optional implementation, the obtaining, by the access device, of a multicast data stream based on attribute information of the first multicast packet and attribute information of the second multicast packet includes: determining, by the access device, a first receiving time of a first multicast packet with first sequence information and a second receiving time of a second multicast packet with the first sequence information; and obtaining, by the access device, the earlier received first multicast packet with the first sequence information or the earlier received second multicast packet with the first sequence information when the first receiving time is different from the second receiving time; or when the first receiving time is the same as the second receiving time, obtaining, by the access device, a third multicast packet with the first sequence information, where the third multicast packet with the first sequence information is obtained by combining the first multicast packet with the first sequence information and the second multicast packet with the first sequence information. The access device obtains the earlier received first multicast packet or the earlier received second multicast packet that has a same sequence number, to improve a speed of obtaining the multicast packets by the access device, and reduce an entire forwarding delay of the multicast packets.

In an optional implementation, the obtaining, by the access device, of the earlier received first multicast packet with the first sequence information or the earlier received second multicast packet with the first sequence information when the first receiving time is different from the second receiving time includes: obtaining, by the access device, the earlier received first multicast packet with the first sequence information or the earlier received second multicast packet with the first sequence information when the first receiving time is different from the second receiving time and the first receiving time or the second receiving time is less than a time threshold. The time threshold is a maximum time in which the access device waits to receive a multicast packet.

In an optional implementation, the method further includes: obtaining, by the access device, an earlier received first multicast packet with second sequence information and an earlier received second multicast packet with the second sequence information when the first receiving time is different from the second receiving time and both the first receiving time and the second receiving time are greater than a time threshold. The access device does not receive a multicast packet with the first sequence information within the time threshold. Therefore, the access device considers that the multicast packet with the first sequence information does not exist, and directly obtains a multicast packet behind the first sequence information, to further reduce a forwarding delay.

In an optional implementation, after the obtaining, by the access device, of the earlier received first multicast packet with the first sequence information or the earlier received second multicast packet with the first sequence information when the first receiving time is different from the second receiving time, the method further includes: deleting, by the access device, the later received second multicast packet with the first sequence information or the later received first multicast packet with the first sequence information. The access device deletes a later received multicast packet, to occupy less bandwidth of a transmission network.

According to a second aspect, an access device is provided, and the access device has a function of implementing behavior of the access device in the foregoing method. The function may be implemented by hardware, or may be implemented by hardware by executing corresponding software. The hardware or software includes one or more modules corresponding to the function.

According to a third aspect, another access device is provided, and the device may include a receiver, a transmitter, and a processor. The receiver is configured to receive an on-demand request sent by a program terminal. The transmitter is configured to separately send the on-demand request to a multicast source device through a first uplink port of the access device and a second uplink port of the access device, so that the multicast source device sends a first multicast packet and a second multicast packet based on the on-demand request. The receiver is further configured to: receive the first multicast packet through the first uplink port of the access device, and receive the second multicast packet through the second uplink port of the access device. The processor is further configured to obtain a multicast data stream based on attribute information of the first multicast packet and attribute information of the second multicast packet. The transmitter is further configured to send the obtained multicast data stream to the program terminal.

The access device may further include a memory. The memory is coupled to the processor, and stores a program instruction and data that are necessary for the access device.

According to another aspect, a computer storage medium is provided. The computer storage medium is configured to store a computer software instruction used by the access device, and the computer storage medium includes a program designed for performing the foregoing aspects.

DESCRIPTION OF EMBODIMENTS

The technical solutions of this application are further described below in detail with reference to accompanying drawings and embodiments.

A multicast service processing method provided in this application may be applied to an IP network. The IP network uses an IGMP-based or protocol independent multicast (PIM)-based multicast control protocol.

Figure 1:
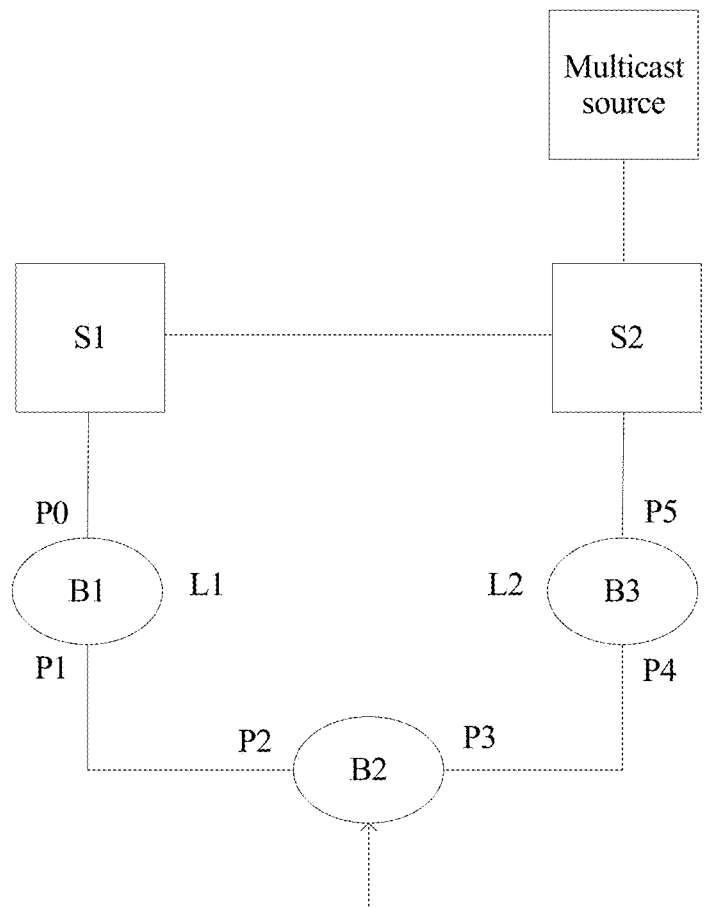
FIG. 1 is a schematic flowchart of a conventional ring network-based multicast service backup.
Figure 2:
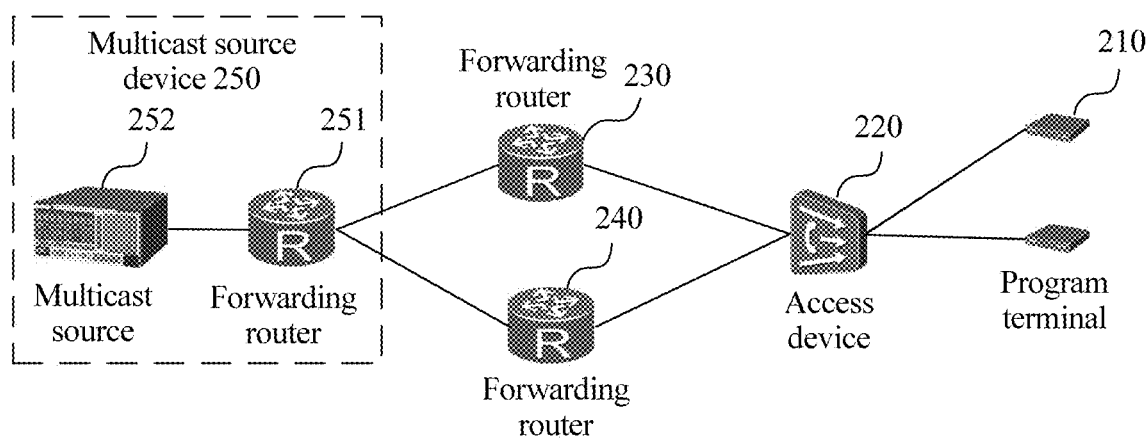
FIG. 2 is a schematic structural diagram of a framework of IP network networking according to an embodiment of the present invention.

FIG. 2 is a schematic structural diagram of a framework of IP network according to an embodiment. As shown in FIG. 2, the IP network networking may include a program terminal 210, an access device 220, a forwarding router 230, a forwarding router 240, and a multicast source device 250. The multicast source device 250 includes a multicast source 252 and a forwarding router 251.

The program terminal 210 sends an on-demand request of a user for a multicast (such as an IGMP) program to the access device 220, and the access device 220 separately sends the on-demand request to both the forwarding router 230 and the forwarding router 240 in uplink. The forwarding router 251 in the multicast source device 250 transfers the same received request to the multicast source 252. The multicast source 252 sends multicast packets to the forwarding router 251 based on the request, to form a multicast data stream (or referred to as a multicast video stream). The forwarding router 230 and the forwarding router 240 forward the multicast data stream to the access device 220. The access device 220 identifies multicast packets one by one in two multicast data streams for a same program, to form a new multicast data stream, and sends the multicast data stream to the program terminal 210.

It may be understood that the IP network networking may include at least one program terminal 210. There may be at least two links between the access device 220 and the multicast source device 250.

It can be understood from this that the access device 220 sends the on-demand request by using a number of forwarding routers, and receives the multicast data stream (or the video stream) by using the number of forwarding routers, thereby improving forwarding quality of the multicast data stream (for example, reducing a packet loss rate in a multicast data stream forwarding process and reducing a multicast data stream forwarding delay) in the IP network.

For example, the multicast program is an IGMP multicast program, and the network networking includes two program terminals.

Figures 3, 4:
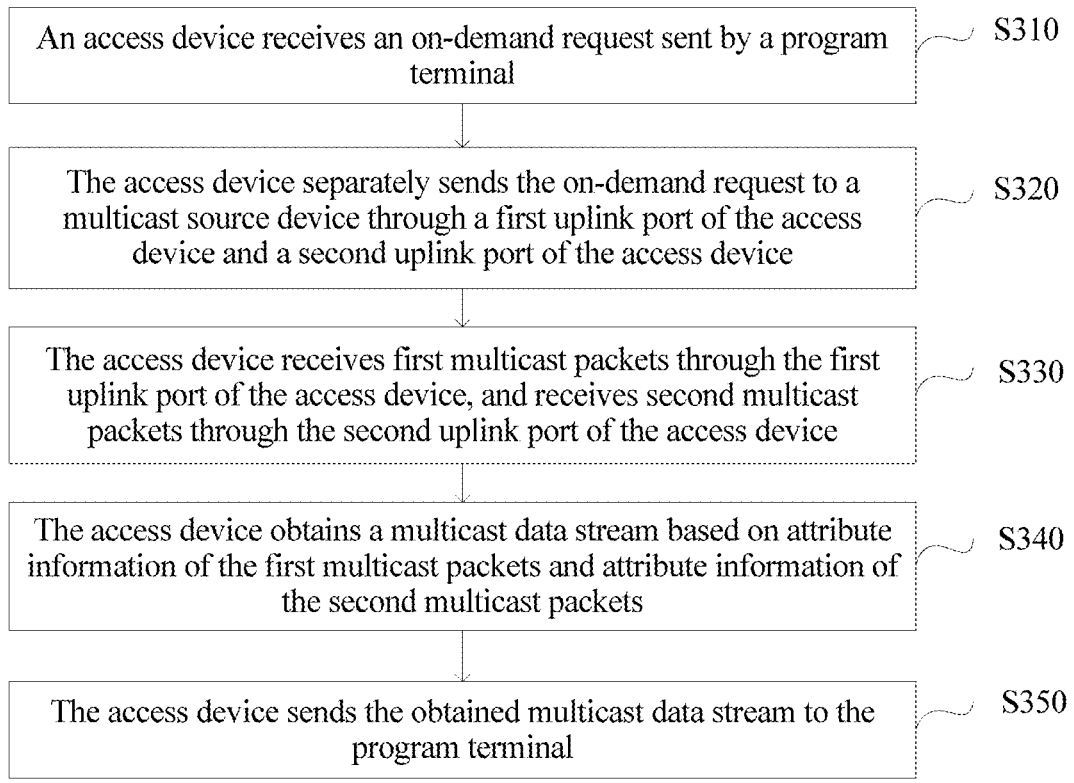
FIG. 3 is a schematic flowchart of a multicast service processing method according to an embodiment of the present invention.
FIG. 4 is a schematic diagram of a format of a real time transport protocol (RTP) packet header.

FIG. 3 is a flowchart of a multicast service processing method according to an embodiment. As shown in FIG. 3, the method may include the following steps.

In Step 310, an access device receives an on-demand request sent by a program terminal.

The access device receives on-demand requests of users of two program terminals for an IGMP multicast program (a same program). The on-demand request carries information about the program that the users want to watch.

Optionally, the access device separately records identification information such as address information of the two program terminals, so that the access device sends multicast program data streams to the corresponding program terminals based on the identification information.

In Step 320, the access device separately sends the on-demand request to a multicast source device through a first uplink port of the access device and a second uplink port of the access device, so that the multicast source device sends a first multicast packet and a second multicast packet based on the on-demand request.

The access device specifies two different uplink ports for each multicast program. The access device may have a function of a proxy server (for example, an Internet group management protocol proxy (IGMP Proxy) server), to send a request or receive a multicast packet.

Optionally, before performing step 320, the access device may copy the on-demand request to obtain two same on-demand requests.

The access device respectively sends, through the first uplink port and the second uplink port, join requests that include the on-demand requests to forwarding routers on two transmission paths, and then sends the join requests to the multicast source device along the two paths.

The first uplink port and the second uplink port are two logical uplink ports, and the logical uplink port may be a physical port of a virtual local area network (VLAN) or a physical port of a virtual private network (VPN). The forwarding routers and the multicast source device separately record identification information of the received join requests, for example, transmitter address information, so that the multicast source device copies multicast packets sent based on the on-demand requests for the same program to obtain the first multicast packet and the second multicast packet. The multicast source device respectively sends the first multicast packet and the second multicast packet to the first uplink port and the second uplink port of the access device by using the forwarding routers.

The multicast packets sent by the multicast source device need to be encapsulated by using a real-time transport protocol (RTP) packet header.

An RTP packet includes a packet header and a payload. A format of the RTP packet header is shown in FIG. 4, and includes an RTP protocol version number V (for example, V=2 indicates that a current protocol version number is 2), a padding identifier P, an extension identifier X, a CSRC counter CC, M, a payload type PT, a sequence number, a timestamp, a synchronization source (SSRC) identifier, and a contributing source (CSRC) identifier.

The sequence number is used to identify a number of the RTP packet sent by a transmitter. The sequence number is increased by 1 each time the transmitter sends one packet, and a receiver may detect a packet loss status by using the sequence number.

In Step 330, the access device receives the first multicast packet through the first uplink port of the access device, and receives the second multicast packet through the second uplink port of the access device.

The access device buffers the first multicast packet received through the first uplink port into a first input queue, and buffers the second multicast packet received through the second uplink port into a second input queue.

In Step 340, the access device obtains a multicast data stream based on attribute information of the first multicast packet and attribute information of the second multicast packet.

The attribute information may be sequence information, for example, a sequence number.

Before performing step 340, the access device determines a first receiving time of a first sequence number in the first input queue and determines a second receiving time of a first sequence number in the second input queue.

When the first receiving time is the same as the second receiving time, the access device obtains a third multicast packet with the first sequence number, where the third multicast packet with the first sequence number is obtained by combining a first multicast packet with the first sequence number and a second multicast packet with the first sequence number, and buffers the third multicast packet with the first sequence number into an output queue.

Alternatively, when the first receiving time is different from the second receiving time, the following uses an example in which the first receiving time is less than the second receiving time.

Optionally, to better reduce a forwarding delay, the access device may configure a time threshold, and the time threshold is a maximum time in which the access device waits to receive a multicast packet.

For example, the first receiving time is less than the second receiving time. When the access device identifies that both the first receiving time and the second receiving time are less than the time threshold, in other words, the access device receives a first multicast packet with the first sequence number and a second multicast packet with the first sequence number within the time threshold, the access device considers that there is no packet loss.

The access device stores the earlier received first multicast packet with the first sequence number in an output queue.

Alternatively, when the access device identifies that the first receiving time is greater than the time threshold, and the second receiving time is less than the time threshold, for example, when the access device receives a second multicast packet with the first sequence number but does not receive a first multicast packet with the first sequence number within the time threshold, the access device considers that a packet loss occurs in the first input queue.

The access device stores the received second multicast packet with the first sequence number in an output queue.

When the access device identifies that the second receiving time is greater than the time threshold and the first receiving time is less than the time threshold, the access device stores a received first multicast packet with the first sequence number in an output queue.

Alternatively, when the access device identifies that both the first receiving time and the second receiving time are greater than the time threshold, in other words, the access device receives neither a first multicast packet with the first sequence number nor a second multicast packet with the first sequence number within the time threshold, the access device considers that a packet loss occurs in both the first input queue and the second input queue.

The access device continues to receive a first multicast packet with a second sequence number or a second multicast packet with a second sequence number. An index of the second sequence number herein is a sequence of sequence numbers. For example, the second sequence number is a sequence number next to the first sequence number. It can be understood that the access device receives multicast packets in a sequence of multicast packet sequence numbers, thereby avoiding outputting out-of-order multicast packets.

Optionally, a multicast packet (a later received multicast packet) that is in the first input queue and the second input queue and that has a sequence number less than or equal to a sequence number that exists in the output queue is deleted, to occupy less bandwidth of a transmission network.

The access device sends, based on the identification information of the program terminals, a multicast data stream that includes multicast packets in the output queue to a corresponding program terminal.

It may be understood that the foregoing multicast packet receiving process of the access device may be further applied to a case in which the first receiving time is greater than the second receiving time. For the sake of brevity, this is not described again in this embodiment.

In Step 350, the access device sends the obtained multicast data stream to the program terminal.

Figure 5:
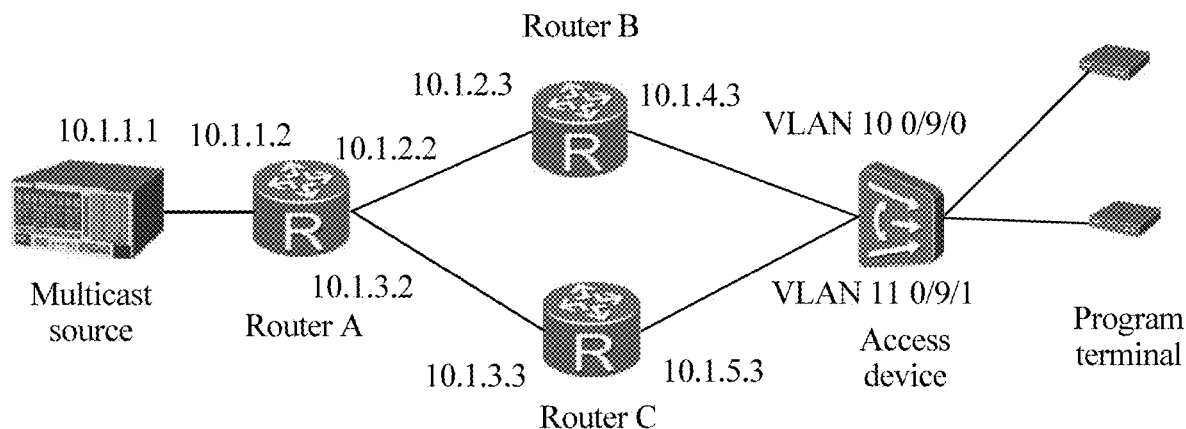
FIG. 5 is a schematic structural diagram of a framework of other IP network networking according to an embodiment of the present invention.

In an example, as shown in FIG. 5, IP network networking includes a multicast source, three routers: a router A, a router B, and a router C, an access device, and a program terminal. The access device enables a function of a proxy (IGMP Proxy) server, and router A, the router B, and the router C separately enable PIM protocols. The access device specifies two different VLAN uplink ports: VLAN 10+0/9/0 and VLAN 11+0/9/1 for a same multicast request.

After the access device receives a multicast request from the program terminal for a multicast program (10.1.1.1, 233.0.0.1), the IGMP proxy respectively sends join requests that include the multicast request to the two uplink ports, and request information of the join requests is (VLAN 10, 0/9/0, 10.1.1.1, 233.0.0.1) and (VLAN 11, 0/9/1, 10.1.1.1, 233.0.0.1). After receiving the join requests, router B and router C, respectively, send the join requests to router A through an interface 10.1.2.3 and an interface 10.1.3.3.

The multicast source is configured to send multicast packets of the program (10.1.1.1, 233.0.0.1) to router A. Router A copies the multicast packets to obtain two groups of multicast packets and respectively sends the two groups of multicast packets to the access device through an interface 10.1.2.2 and an interface 10.1.3.2 of router A. The access device may simultaneously receive the multicast packets of the program (10.1.1.1, 233.0.0.1) through the port (VLAN 10, 0/9/0) and the port (VLAN 11, 0/9/1). In other words, the access device receives the multicast packets along two paths. After entering the access device, the multicast packets on the two paths are respectively buffered into a queue A through the port (VLAN 10, 0/9/0) and a queue B through the port (VLAN 11, 0/9/1). The access device identifies sequence number fields of RTP packet headers of the multicast packets to identify packet loss statuses of the multicast packets on the two paths, and performs combination.

Figure 6:
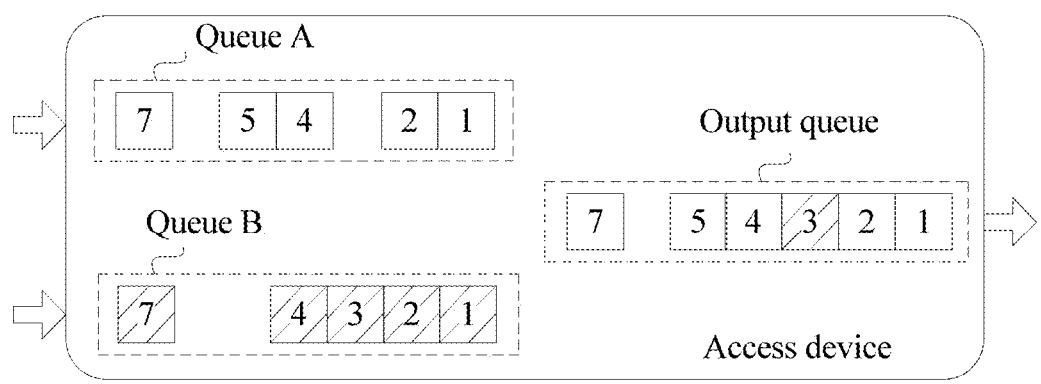
FIG. 6 is a schematic diagram of a multicast service processing process of an access device according to an embodiment of the present invention.

As shown in FIG. 6, the foregoing process of the access device may be, for example, as follows:

At a moment T1, the access device successively receives a multicast packet 1 and a multicast packet 2 into the queue A, and receives a multicast packet 1 and a multicast packet 2 into the queue B. If a first receiving time in which the access device receives the multicast packet 1 into the queue A is less than a second receiving time in which the access device receives the multicast packet 1 into the queue B, the access device buffers the multicast packet 1 in the queue A into an output queue. Then the access device identifies the multicast packet 2 in the queue A and the multicast packet 2 in the queue B. If the access device identifies that a first receiving time in which the multicast packet 2 is received into the queue A is greater than a second receiving time in which the multicast packet 2 is received into the queue B, the access device buffers the multicast packet 2 in the queue B into the output queue.

Due to link quality, a multicast packet 3 is lost when multicast packets of (10.1.1.1, VLAN 10, 233.0.0.1) are forwarded by using the router B. To reduce a forwarding delay, when a first receiving time in which the access device receives the multicast packet 3 into the queue A is greater than a time threshold and a second receiving time in which the access device receives the multicast packet 3 into the queue B is less than the time threshold, the access device buffers the multicast packet 3 in the queue B into the output queue.

Alternatively, due to link quality, a multicast packet 5 is lost when multicast packets of (10.1.1.1, VLAN 11, 233.0.0.1) are forwarded by using router C. To reduce a forwarding delay, when a first receiving time in which the access device receives the multicast packet 5 into the queue A is less than a time threshold and a second receiving time in which the access device receives the multicast packet 5 into the queue B is greater than the time threshold, the access device buffers the multicast packet 5 in the queue A into the output queue.

Alternatively, due to link quality, a multicast packet 6 is lost when multicast packets of (10.1.1.1, VLAN 11, 233.0.0.1) are forwarded by using router C and multicast packets of (10.1.1.1, VLAN 10, 233.0.0.1) are forwarded by using router B. For example, both a first receiving time in which the access device receives the multicast packet 6 into the queue A and a second receiving time in which the access device receives the multicast packet 6 into the queue B are greater than a time threshold. In this case, the access device gives up receiving the multicast packet 6, and continues to receive a multicast packet 7.

Finally, the access device deletes a multicast packet that is in the queue A and the queue B and that has a sequence number less than or equal to a sequence number in the output queue. Therefore, multicast packets finally received by the program terminal are a multicast data stream of multicast packets 1, 2, 3, 4, 5, and 7.

According to this method, a packet is forwarded in an IP network. A dual-transmitter and dual-receiver structure of the access device is used, thereby reducing a packet loss rate of the IP network, and the time threshold specified for the access device, thereby reducing a forwarding delay, and meeting a user experience requirement for video experience.

Corresponding to the foregoing method, another embodiment provides an access device.

Figure 7:
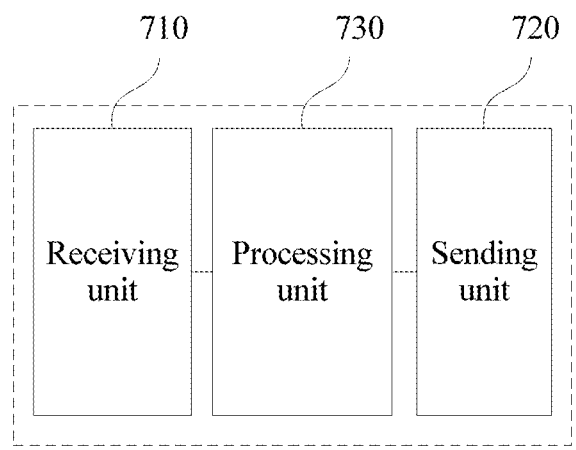
FIG. 7 is a possible schematic structural diagram of an access device according to an embodiment of the present invention.

FIG. 7 is a possible schematic structural diagram of an access device according to an embodiment. As shown in FIG. 7, the access device may include a receiving unit 710, a sending unit 720, and a processing unit 730.

The receiving unit 710 is configured to receive an on-demand request sent by a program terminal.

The sending unit 720 is configured to separately send the on-demand request to a multicast source device through a first uplink port of the access device and a second uplink port of the access device, so that the multicast source device sends first multicast packet and second multicast packet based on the on-demand request.

The receiving unit 710 is further configured to: receive the first multicast packet through the first uplink port of the access device, and receive the second multicast packet through the second uplink port of the access device.

The processing unit 730 is further configured to obtain a multicast data stream based on attribute information of the first multicast packet and attribute information of the second multicast packet.

The sending unit 720 is further configured to send the multicast data stream obtained by the processing unit 730 to the program terminal.

Optionally, the attribute information is sequence information; and the processing unit 730 is specifically configured to obtain the multicast data stream based on sequence information of the first multicast packet and sequence information of the second multicast packet.

Optionally, the processing unit 730 is further configured to determine a first receiving time of a first multicast packet with first sequence information and a second receiving time of a second multicast packet with the first sequence information.

The processing unit 730 obtains the earlier received first multicast packet with the first sequence information or the earlier received second multicast packet with the first sequence information when the first receiving time is different from the second receiving time; or, when the first receiving time is the same as the second receiving time, the processing unit 730 obtains a third multicast packet with the first sequence information, where the third multicast packet with the first sequence information is obtained by combining the first multicast packet with the first sequence information and the second multicast packet with the first sequence information.

Optionally, the processing unit 730 is configured to obtain the earlier received first multicast packet with the first sequence information or the earlier received second multicast packet with the first sequence information when the first receiving time is different from the second receiving time and the first receiving time or the second receiving time is less than a time threshold.

Optionally, the processing unit 730 is configured to obtain an earlier received first multicast packet with second sequence information and an earlier received second multicast packet with the second sequence information when the first receiving time is different from the second receiving time and both the first receiving time and the second receiving time are greater than a time threshold.

Optionally, the processing unit 730 is further configured to delete the later received second multicast packet with the first sequence information or the later received first multicast packet with the first sequence information.

Functions of functional units of the access device may be implemented by performing the steps in the foregoing embodiments. Therefore, for the sake of brevity, a working process of the access device provided in this embodiment is not described herein again.

Figure 8:
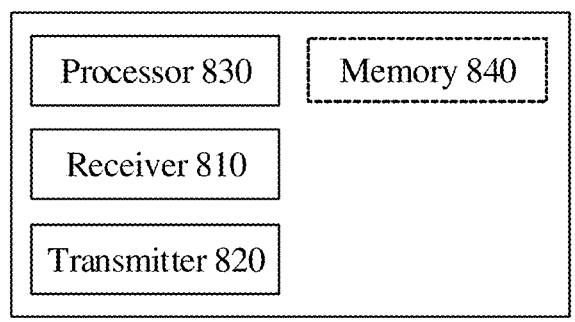
FIG. 8 is a possible schematic structural diagram of another access device according to an embodiment of the present invention.

FIG. 8 is a possible schematic structural diagram of another access device according to an embodiment. As shown in FIG. 8, the access device may include a receiver 810, a transmitter 820, and a processor 830.

Optionally, the access device may further include a memory 840.

The processor 830 may be a central processing unit (CPU), or a combination of a CPU and a hardware chip. The hardware chip may be an application-specific integrated circuit (ASIC), a programmable logic device (PLD), or a combination thereof. The PLD may be a complex programmable logical device (CPLD), a field-programmable gate array (FPGA), generic array logic (GAL), or any combination thereof. The processor 830 is configured to control an entire network device and signal processing.

The memory 840 may include a volatile memory, for example, a random access memory (RAM); or the memory 840 may include a nonvolatile memory, for example, a read-only memory (ROM), a flash memory, a hard disk, or a solid-state drive; or the memory 840 may include a combination of the foregoing types of memories. The memory 840 is configured to store various applications, operating systems, and data. The memory 840 may transmit the stored data to the processor 830.

It should be noted that the memory 840 may be integrated into the processor 830 or may exist independently. The access device may be integrated into a terminal or may exist independently.

The receiver 810 is configured to receive an on-demand request sent by a program terminal.

The transmitter 820 is configured to separately send the on-demand request to a multicast source device through a first uplink port of the access device and a second uplink port of the access device, so that the multicast source device sends first multicast packet and second multicast packet based on the on-demand request.

The receiver 810 is further configured to: receive the first multicast packet through the first uplink port of the access device, and receive the second multicast packet through the second uplink port of the access device.

The processor 830 is further configured to obtain a multicast data stream based on attribute information of the first multicast packet and attribute information of the second multicast packet.

The transmitter 820 is further configured to send the multicast data stream obtained by the processor 830 to the program terminal.

Optionally, the attribute information is sequence information; and the processor 830 is configured to obtain the multicast data stream based on sequence information of the first multicast packet and sequence information of the second multicast packet.

Optionally, the processor 830 is further configured to determine a first receiving time of a first multicast packet with first sequence information and a second receiving time of a second multicast packet with the first sequence information.

The processor 830 obtains the earlier received first multicast packet with the first sequence information or the earlier received second multicast packet with the first sequence information when the first receiving time is different from the second receiving time; or, when the first receiving time is the same as the second receiving time, the processor 830 obtains a third multicast packet with the first sequence information, where the third multicast packet with the first sequence information is obtained by combining the first multicast packet with the first sequence information and the second multicast packet with the first sequence information.

Optionally, the processor 830 is configured to obtain the earlier received first multicast packet with the first sequence information or the earlier received second multicast packet with the first sequence information when the first receiving time is different from the second receiving time and the first receiving time or the second receiving time is less than a time threshold.

Optionally, the processor 830 is configured to obtain an earlier received first multicast packet with second sequence information and an earlier received second multicast packet with the second sequence information when the first receiving time is different from the second receiving time and both the first receiving time and the second receiving time are greater than a time threshold.

Optionally, the processor 830 is further configured to delete the later received second multicast packet with the first sequence information or the later received first multicast packet with the first sequence information.

For problem-resolving implementations and beneficial effects of the components of the access device in this embodiment, refer to the implementations and the beneficial effects of the foregoing method. Therefore, for the sake of brevity, details are not described herein again.

A person skilled in the art may be further aware that, in combination with the examples described in the embodiments, units and algorithm steps may be implemented by electronic hardware, computer software, or a combination thereof. To clearly describe interchangeability between the hardware and the software, the foregoing has generally described compositions and steps of each example based on functions. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A person of ordinary skill in the art may understand that all or some of the steps of the method in the foregoing embodiment may be implemented by a program instructing a processor. The program may be stored in a computer readable storage medium. The storage medium may be a non-transitory medium, such as a random access memory, a read-only memory, a flash memory, a hard disk, a solid-state drive, a magnetic tape, a floppy disk, an optical disc, or any combination thereof.

The foregoing descriptions are merely example specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A multicast service processing method, comprising:
   receiving, by an access device, an on-demand request sent by a program terminal;
   separately sending, by the access device, the on-demand request to a multicast source device through a first uplink port of the access device and a second uplink port of the access device, so that the multicast source device sends a first multicast packet and a second multicast packet based on the on-demand request;
   receiving, by the access device, the first multicast packet through the first uplink port of the access device, and receiving the second multicast packet through the second uplink port of the access device;
   obtaining, by the access device, a multicast data stream based on attribute information of the first multicast packet and attribute information of the second multicast packet; and
   sending, by the access device, the multicast data stream to the program terminal,
   wherein the access device simultaneously handles the first multicast packet and the second multicast packet to obtain the multicast data stream, and the handling of the access device includes simultaneously counting each receiving time of the first multicast packet and the second multicast packet,
   wherein a time threshold for receiving of the first multicast packet and the time threshold for receiving of the second multicast packet are simultaneously calculated, and if both the first multicast packet and the second multicast packet are not received within the time threshold, the access device considers that a multicast packet with first sequence information does not exist, and the access device directly obtains the first multicast packet and the second multicast packet of a next sequence, in order to minimize a forwarding delay.

2. The method according to claim 1, wherein the attribute information is sequence information; and
   the obtaining, by the access device, of the multicast data stream based on attribute information of the first multicast packet and attribute information of the second multicast packet comprises:
   obtaining, by the access device, the multicast data stream based on sequence information of the first multicast packet and sequence information of the second multicast packet.

3. The method according to claim 1, wherein the obtaining, by the access device, of the multicast data stream based on attribute information of the first multicast packet and attribute information of the second multicast packet comprises:
   determining, by the access device, a first receiving time of the first multicast packet with the first sequence information and a second receiving time of the second multicast packet with the first sequence information; and
   obtaining, by the access device, the earlier received first multicast packet with the first sequence information or the earlier received second multicast packet with the first sequence information when the first receiving time is different from the second receiving time; or
   when the first receiving time is the same as the second receiving time, obtaining, by the access device, a third multicast packet with the first sequence information, wherein the third multicast packet with the first sequence information is obtained by combining the first multicast packet with the first sequence information and the second multicast packet with the first sequence information.

4. The method according to claim 2, wherein the obtaining, by the access device, of the multicast data stream based on attribute information of the first multicast packet and attribute information of the second multicast packet comprises:

determining, by the access device, a first receiving time of the first multicast packet with first sequence information and a second receiving time of the second multicast packet with the first sequence information; and obtaining, by the access device, the earlier received first multicast packet with the first sequence information or the earlier received second multicast packet with the first sequence information when the first receiving time is different from the second receiving time; or when the first receiving time is the same as the second receiving time, obtaining, by the access device, a third multicast packet with the first sequence information, wherein the third multicast packet with the first sequence information is obtained by combining the first multicast packet with the first sequence information and the second multicast packet with the first sequence information.

5. The method according to claim 3, wherein the obtaining, by the access device, of the earlier received first multicast packet with the first sequence information or the earlier received second multicast packet with the first sequence information when the first receiving time is different from the second receiving time comprises:

obtaining, by the access device, the earlier received first multicast packet with the first sequence information or the earlier received second multicast packet with the first sequence information when the first receiving time is different from the second receiving time and the first receiving time or the second receiving time is less than the time threshold.

6. The method according to claim 3, further comprising:

obtaining, by the access device, the earlier received first multicast packet with second sequence information and the earlier received second multicast packet with the second sequence information when the first receiving time is different from the second receiving time and both the first receiving time and the second receiving time are greater than the time threshold.

7. The method according to claim 3, wherein after the obtaining, by the access device, of the earlier received first multicast packet with the first sequence information or the earlier received second multicast packet with the first sequence information when the first receiving time is different from the second receiving time, the method further comprises:

deleting, by the access device, the later received second multicast packet with the first sequence information or the later received first multicast packet with the first sequence information.

8. The method according to claim 4, wherein after the obtaining, by the access device, of the earlier received first multicast packet with the first sequence information or the earlier received second multicast packet with the first sequence information when the first receiving time is different from the second receiving time, the method further comprises:

deleting, by the access device, the later received second multicast packet with the first sequence information or the later received first multicast packet with the first sequence information.

9. The method according to claim 5, wherein after the obtaining, by the access device, of the earlier received first multicast packet with the first sequence information or the earlier received second multicast packet with the first sequence information when the first receiving time is different from the second receiving time, the method further comprises:

deleting, by the access device, the later received second multicast packet with the first sequence information or the later received first multicast packet with the first sequence information.

10. An access device, the access device comprising a receiver, a transmitter, and a processor, wherein the receiver is configured to receive an on-demand request sent by a program terminal;

the transmitter is configured to separately send the on-demand request to a multicast source device through a first uplink port of the access device and a second uplink port of the access device, so that the multicast source device sends first multicast packets and second multicast packets based on the on-demand request;

the receiver is further configured to: receive the first multicast packets through the first uplink port of the access device, and receive the second multicast packets through the second uplink port of the access device;

the processor is further configured to obtain a multicast data stream based on attribute information of the first multicast packets and attribute information of the second multicast packets; and the transmitter is further configured to send the obtained multicast data stream to the program terminal, wherein the access device simultaneously handles the first multicast packet and the second multicast packet to obtain the multicast data stream, and the handling of the access device includes simultaneously counting each receiving time of the first multicast packet and the second multicast packet, wherein a time threshold for receiving of the first multicast packet and the time threshold for receiving of the second multicast packet are simultaneously calculated, and if both the first multicast packet and the second multicast packet are not received within the time threshold, the access device considers that a multicast packet with first sequence information does not exist, and the access device directly obtains the first multicast packet and the second multicast packet of a next sequence, in order to minimize a forwarding delay.

11. The device according to claim 10, wherein the attribute information is sequence information; and the processor is configured to obtain the multicast data stream based on sequence information of the first multicast packets and sequence information of the second multicast packets.

12. The device according to claim 10, wherein the processor is further configured to determine a first receiving time of the first multicast packet with the first sequence information and a second receiving time of the second multicast packet with the first sequence information; and the processor obtains the earlier received first multicast packet with the first sequence information or the earlier received second multicast packet with the first sequence information when the first receiving time is different from the second receiving time; or when the first receiving time is the same as the second receiving time, the processor obtains a third multicast packet with the first sequence information, wherein the third multicast packet with the first sequence information is obtained by combining the first multicast packet with the first sequence information and the second multicast packet with the first sequence information.

13. The device according to claim 11, wherein the processor is further configured to determine a first receiving time of the first multicast packet with first sequence information and a second receiving time of the second multicast packet with the first sequence information; and the processor obtains the earlier received first multicast packet with the first sequence information or the earlier received second multicast packet with the first sequence information when the first receiving time is different from the second receiving time; or when the first receiving time is the same as the second receiving time, the processor obtains a third multicast packet with the first sequence information, wherein the third multicast packet with the first sequence information is obtained by combining the first multicast packet with the first sequence information and the second multicast packet with the first sequence information.

14. The device according to claim 12, wherein the processor is configured to obtain the earlier received first multicast packet with the first sequence information or the earlier received second multicast packet with the first sequence information when the first receiving time is different from the second receiving time and the first receiving time or the second receiving time is less than the time threshold.

15. The device according to claim 12, wherein the processor is configured to obtain the earlier received first multicast packet with second sequence information and the earlier received second multicast packet with the second sequence information when the first receiving time is different from the second receiving time and both the first receiving time and the second receiving time are greater than the time threshold.

16. The device according to claim 12, wherein the processor is further configured to delete the later received second multicast packet with the first sequence information or the later received first multicast packet with the first sequence information.

17. The device according to claim 13, wherein the processor is further configured to delete the later received second multicast packet with the first sequence information or the later received first multicast packet with the first sequence information.

18. The device according to claim 14, wherein the processor is further configured to delete the later received second multicast packet with the first sequence information or the later received first multicast packet with the first sequence information.

19. The method according to claim 1, wherein the access device includes a first queue, a second queue and an output queue, the first queue stores the first multicast packet, the second queue stores the second multicast packet, and a receiving time of the first multicast packet and a receiving time of the second multicast packet are simultaneously counted such that the output queue receives a packet from the first queue or the second queue based on predetermined rules for the simultaneously counted receiving times, wherein a later received first multicast packet in the first queue or a later received second multicast packet in the second queue, that has a sequence number less than or equal to a sequence number of a multicast packet that exists in the output queue, is deleted from the first queue or the second queue, in order to occupy minimized bandwidth of a transmission network.

20. The method according to claim 19, wherein the calculated time threshold is further considered for the packet to be forwarded to the output queue from the first queue or the second queue.

* * * * *